(12) United States Patent
Cheng et al.

(10) Patent No.: US 9,574,118 B2
(45) Date of Patent: Feb. 21, 2017

(54) ADHESIVE COMPOSITIONS

(71) Applicant: Henkel US IP LLC, Rocky Hill, CT (US)

(72) Inventors: Chih-min Cheng, Westford, MA (US); James Murray, Newmarket, NH (US); Charles F. Schuft, Boxborough, MA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 88 days.

(21) Appl. No.: 14/266,971

(22) Filed: May 1, 2014

(65) Prior Publication Data

US 2014/0235758 A1 Aug. 21, 2014

Related U.S. Application Data

(63) Continuation of application No. PCT/US2012/061883, filed on Oct. 25, 2012.

(60) Provisional application No. 61/559,256, filed on Nov. 14, 2011.

(51) Int. Cl.
*C09J 133/12* (2006.01)
*C09J 109/00* (2006.01)
*C09J 133/10* (2006.01)
*C08L 63/00* (2006.01)

(52) U.S. Cl.
CPC ............ *C09J 133/12* (2013.01); *C09J 109/00* (2013.01); *C09J 133/10* (2013.01)

(58) Field of Classification Search
CPC ..... C09J 133/12; C09J 163/00; C09J 2203/10; C09J 133/10; B32B 37/12; B32B 2037/1269; C08L 63/00; C08L 9/00
USPC .......................................... 523/438; 524/236
See application file for complete search history.

(56) References Cited

U.S. PATENT DOCUMENTS

| 4,426,243 A | 1/1984 | Briggs |
| 4,536,546 A | 8/1985 | Briggs |
| 6,433,091 B1 | 8/2002 | Chen |
| 6,730,411 B1* | 5/2004 | Doe ........................ C09J 4/00 |
| | | 428/500 |
| 6,869,497 B2 | 3/2005 | Doe et al. |
| 6,887,574 B2 | 5/2005 | Dean et al. |
| 6,894,113 B2 | 5/2005 | Court et al. |
| 7,019,075 B2* | 3/2006 | Righettini ............. C08F 279/00 |
| | | 524/548 |
| 7,670,649 B2 | 3/2010 | Hoyles et al. |
| 7,745,535 B2 | 6/2010 | Schmidt et al. |
| 7,820,760 B2 | 10/2010 | Pham et al. |
| 2002/0117259 A1 | 8/2002 | Giroux et al. |
| 2002/0164485 A1 | 11/2002 | Martin |
| 2004/0197587 A1 | 10/2004 | Doe et al. |
| 2004/0229990 A1 | 11/2004 | Righettini et al. |
| 2005/0272835 A1* | 12/2005 | Iwakiri ................. C08G 65/336 |
| | | 523/218 |
| 2008/0287595 A1 | 11/2008 | Verghese et al. |
| 2010/0065210 A1 | 3/2010 | Schuft et al. |

FOREIGN PATENT DOCUMENTS

| CN | 101312811 A | | 11/2008 |
| GB | 2166447 A | | 5/1986 |
| TW | 200936720 | | 9/2009 |
| TW | 200936720 A | * | 9/2009 |
| WO | 2009018193 A1 | | 5/2009 |
| WO | 2010008931 A1 | | 1/2010 |

OTHER PUBLICATIONS

International Search Report for PCT/US2012/061883, 2 pages.

* cited by examiner

*Primary Examiner* — Michael M Bernshteyn
(74) *Attorney, Agent, or Firm* — Steven C. Bauman

(57) ABSTRACT

The present invention provides fast fixturing two part adhesive compositions which include a first part containing a (meth)acrylic component and a cure system for the epoxy resin component of the second part and a second part containing an epoxy resin component and a cure system for the (meth)acrylic component of the first part.

16 Claims, No Drawings

ADHESIVE COMPOSITIONS

BACKGROUND

Field

The present invention provides fast fixturing two part adhesive compositions which include a first part containing a (meth)acrylic component and a cure system for the epoxy resin component of the second part and a second part containing an epoxy resin component and a cure system for the (meth)acrylic component of the first part.

Brief Description of Related Technology

One approach to these adhesives are (meth)acrylates with reactive crosslinkers, such as epoxides. Acrylic-based adhesive compositions are well known. See e.g. U.S. Pat. No. 4,536,546 (Briggs). While adhesives based on this technology appear to have been sold under the tradename PLEXUS MA 300 and 310 by Illinois Tool Works Inc., Chicago, Ill., they can exhibit an obnoxious odor and they are toxic to handle, which are significant drawbacks to their use.

Two-part epoxy resin compositions are also known, where one of the parts includes an acrylic-based adhesive. For instance, U.S. Pat. No. 4,426,243 (Briggs) describes an adhesive composition that is prepared from two different adhesive materials, one being an epoxy resin and the other an acrylate-based adhesive, being chemically bonded together by a bifunctional component having as one of its functional groups an epoxy and as the other an acrylate. See also U.K. Patent No. GB 2166447B.

U.S. Patent Application Publication No. US2010/0065210 provides a sag-resistant composition including: (a) a first part which includes: (i) a (meth)acrylic component, (ii) an amine catalyst; (iii) an optional second catalyst; (iv) a reactive acid component, and (v) a free-radical inhibitor; and (b) a second part which includes: (i) a resin component which includes epoxy groups, (ii) a peroxide; and (iii) a metal compound which complexes with the strong acid component and which is substantially non-reactive with the peroxide. The first and second parts are of sufficiently low viscosity to be easily dispensed with a pumping apparatus. To form this adhesive, the first and second parts are mixed, and immediately after mixing, the mixture is of a higher viscosity, such that the adhesive does not sag, drip, or migrate, after application to a surface within the open time of the mixture, and the mixed first and second parts cure. By the term "open time" is meant the elapsed time between the mixture of the adhesive to the curing.

Existing compositions do not possess the desired fast fixturing and good adhesion properties for the assembly of laminates, such as hand held display devices.

SUMMARY

An adhesive composition comprising:
(a) a first part comprising:
  (i) a (meth)acrylic component at least a portion of which comprises isobornyl(meth)acrylate;
  (ii) an amine catalyst;
  (iii) a vinyl terminated polybutadiene in liquid form at room temperature;
  (iv) a reactive acid component;
  (v) a solid zinc (meth)acrylate salt;
  (vi) a zinc and/or bismuth complex; and
  (vii) a free-radical inhibitor; and
(b) a second part comprising:
  (i) a resin component comprising epoxy groups;
  (ii) a benzoyl peroxide;
  (iii) a plasticizer; and
  (iv) optionally, a block copolymer,
wherein when the first and second parts are mixed and applied to at least one substrate, the composition will have up to 5 minutes of open time and when the substrates are mated they will show a fixture time of less than 90 seconds at a temperature of less than 60° C. at which point the mated assembly can support 3 kg load.

In another aspect, the present invention provides a method of bonding two surfaces, using the disclosed composition.

DETAILED DESCRIPTION

The adhesives and sealants of this invention are useful for laminating metallic and/or polymeric materials for use in hand held display device assembly applications.

Accordingly, this invention provides a two-part adhesive composition including a first part containing an acrylic component and a cure system for the epoxy resin component of the second part and a second part containing an epoxy resin component and a cure system for the acrylic component of the first part. The combination of parts (a) and (b) results in a composition that cures and forms a material suitable for use in the fabrication of laminates. Thus, the combination of parts (a) and (b) can be applied to a surface to be laminated, and that surface can be mated to a second surface to form the laminate. After curing, the composition forms a firm adhesive bond between the two surfaces.

PART (A)

(Meth)acrylic Components

Any suitable material which contains at least one group having the following formula:

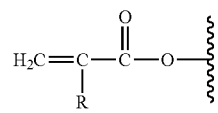

where R is selected from H, halogen, or $C_1$ to $C_{10}$ hydrocarbyl, may be used.

Advantageously, the group is a (meth)acryloxy group. The term "(meth)acryloxy" is intended to refer to both acrylate and methacrylate, in which R is H or methyl, respectively. The useful amount of the (meth)acrylic component typically ranges from about 20 percent by weight to about 80 percent by weight of the total composition. Desirably, the inventive compositions contain from about 50 percent by weight to about 70 percent by weight of (meth)acrylic component.

At least a portion of the (meth)acrylate is isobornyl(meth)acrylate. For instance, about 5 percent by weight to about 35 percent by weight of the inventive composition should be isobornyl(meth)acrylate.

The (meth)acrylic component may be present in the form of a polymer, a monomer, or a combination thereof. When present in the form of a polymer, the (meth)acrylic component may be a polymer chain to which is attached at least one of the above-indicated groups. The groups may be located at a pendant or a terminal position of the backbone, or a combination thereof. Advantageously, at least two such groups may be present, and may be located at terminal positions. The (meth)acrylic component may have a polymer chain, constructed from polyvinyl, polyether, polyester, polyurethane, polyamide, epoxy, vinyl ester, phenolic, amino resin, oil based, and the like, as is well known to those skilled in the art, or random or block combinations thereof.

The polymer chain may be formed by polymerization of vinyl monomers. Illustrative examples of such vinyl monomers are methyl (meth)acrylate, (meth)acrylic acid, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(meth)acryloyloxypropyltrimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, ethoxylated trimethylolpropane triacrylate, trimethylol propane trimethacrylate, dipentaerythritol monohydroxypentaacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate and ethoxylated bisphenol A di(meth)acrylate. These monomers may be used each alone or a plurality of them may be copolymerized.

Particularly desirable (meth)acrylate ester monomers include those where the alcohol portion of the ester group contains 1-8 carbon atoms. For instance, 2-ethylhexyl methacrylate, hydroxyethyl methacrylate, cyclohexyl methacrylate, ethyl methacrylate, 1,3-butanedioldimethacrylate (BDMA), butyl methacrylate and methyl methacrylate (MMA), are examples.

Amines

The inventive compositions include at least one amine that acts as a catalyst by accelerating or otherwise promoting curing of the present inventive compositions. The amines desirably are tertiary or sterically hindered. Suitable amines include, for example, tertiary amines represented by the formula $NR_3$, where R is selected from alkyl, aryl, alkaryl, or aralkyl radicals, including $C_{1-10}$ alkyl, $C_{6-18}$ aryl, $C_{7-15}$ alkaryl, and $C_{7-15}$ aralkyl radicals. Suitable hindered amines also include primary or secondary amines, such as $HNR_2$ or $H_2NR$, where R is a $C_{4-10}$ alkyl. For example, alkyl groups such as tertiary butyl, or neopentyl, sterically shield the hydrogen bound to the nitrogen atom, and are suitable substituents in this component of the present invention. For either tertiary amines or secondary amines, the R groups may be linked so that the nitrogen is embedded within a cyclic structure.

Particularly useful amines for inclusion in the present inventive compositions include, for example, 1,8-diazabicyclo(5.4.0)undec-7-ene (DBU), 1,4-diazabicyclo(2.2.2)octane (DABCO), triethylamine, and substituted guanidines, such as tetramethylguanidine (TMG), dimethyl-p-toluidine (DMPT), dimethyl aniline, dihydroxyethyl aniline, dihydroxy ethyl p-toluidine, dimethyl-o-toluidine, dialkyl aniline, dialkyl toluidine and the like, acyl thiourea, benzoylthiourea, and aryl-thiourea.

The amine can be present in an amount from about 0.01 percent by weight to about 5 percent by weight. Desirably, the amine is present in an amount from about 0.05 percent by weight to about 2 percent by weight. More desirably, the amine is present in amount from about 0.3 percent by weight to about 0.7 percent by weight.

Vinyl-Terminated Polybutadiene

The vinyl-terminated polybutadienes should be in liquid form at room temperature. The vinyl-terminated polybutadienes should have a glass transition temperature below 0° C. The vinyl-termination may be in the form of (meth)acrylate-termination, for instance (meth)acrylate-terminated polybutadiene-acrylonitrile copolymers such as HYCAR VTBN, or (meth)acrylate-terminated polybutadiene, such as HYCAR VTB, each from BF Goodrich. The vinyl-terminated polybutadienes should be present in an amount of up to about 20 weight percent, such as about 5 weight percent to about 15 weight percent.

Reactive Acid Component

The inventive compositions include an acid or acid ester. Suitable acids or acid esters include phosphoric acid or derivatives, phosphate acid esters, and sulfonic acids or derivatives. A preferred reactive acid component is a phosphate acid ester.

The acid monomer is free-radical polymerizable acid monomers, such as ethylenically unsaturated mono or polycarboxylic acids, maleic acid and crotonic acid. Desirable ones include methacrylic acid (MAA) and acrylic acid. The reactive acid component also modulates and decelerates the curing time of the thermoset composition. The amine component is necessary to cure the epoxy resin-containing part (b), but without a phosphate ester component, the amine-induced curing process is generally too rapid for very large parts or laminates, making fabrication of the laminate too difficult. Additionally, excessively fast curing can cause trouble during curing, such as excessive heat from the exothermic curing reaction, and give inconsistent or uneven curing, and the resultant product may have undesirable physical characteristics, such as bubbling, brittleness, or less tensile strength than can be achieved when the curing is at a more measured rate. Suitable phosphate esters include those represented by the formula:

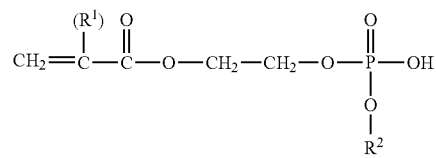

where $R^1$ is H or $CH_3$, and $R^2$ is H, or a radical represented by the structure:

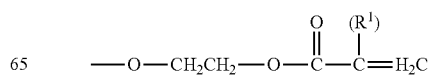

where $R^1$ is H or $CH_3$. A particularly useful phosphate ester is hydroxyl ethyl methacrylate (HEMA) phosphate ester, which is sold under the tradenames T-MULZ 1228 or HARCRYL 1228 or 1228M, each available from Harcross Chemicals, Kansas City, Kans. Also included are structures with at least one strong acid "active hydrogen" group, or with at least one phosphonic acid active hydrogen group ($R_1R_2POOH$), such as hydroxyl ethyl diphosphonic acid, phosphonic acid, and derivatives, or oligomeric or polymeric structures with phosphonic acid functionality or similar acid strength functionality.

The reactive acid component is present from about 0.25 percent by weight to about 15 percent by weight of the composition. Desirably, where the reactive acid component is a phosphate ester, it is present from about 1.0 to 4.0 percent by weight of the composition.

Solid Zinc (Meth)acrylate Salt

The part (a) also contains a solid zinc (meth)acrylate salt such as SR708m, available commercially from Sartomer USA, LLC of Exton, Pa. The solid zinc (meth)acrylate should be present in an amount of about 0.1 weight percent to about 20 weight percent.

Zinc and/or Bismuth Complex

The part (a) also contains a basic metal component, which neutralizes—complexes with or chelates—the reactive acid component of part (a) during the curing process. The basic metal component ordinarily is a zinc and/or bismuth complex, examples of which include for bismuth salicylate, bismuth (III) oxide, bismuth aluminate, bismuth subcarbonate, BiCAT Z (a zinc carboxylate mixture from Shepard Chemical Co., Norwood, Ohio), BiCAT V (bismuth/zinc neodecanoate mixture from Shepard Chemical Co.) The zinc and/or bismuth complex should be present in an amount from about 0.25 percent by weight to about 10 percent by weight. Desirably, the zinc and/or bismuth complex is present in an amount from about 1 percent by weight to about 5 percent by weight.

Free Radical Inhibitors

The part (a) composition also includes a free radical polymerization inhibitor, which prevents the part (a) from reacting prematurely prior to mixing.

Numerous suitable free-radical polymerization inhibitors are known in the art, and include quinones, hydroquinones, hydroxylamines, nitroxyl compounds, phenols, amines, arylamines, quinolines, phenothiazines, and the like. Particularly useful free radical inhibitors include hydroquinone, tertiary butylhydroquinone (TBHQ), methyl hydroquinone, hydroxyethylhydroquinone, phenothiazine, and NAUGARD-R (blend of N-alkyl substituted p-phenylenediamines, from Crompton Corp.). One or more individual free radical inhibitor components may also be combined.

Other Additives

Part (a) may contain additional additives too, such as fillers, core shell polymers, lubricants, thickeners, and coloring agents. The fillers provide bulk without sacrificing strength of the adhesive and can be selected from high or low density fillers. Also, certain fillers, such as silica, can confer rheological modification or small particle reinforcements. Commercially available examples include Cab-O-Sil 610 and AEROSIL R8200.

Of particular interest are low density fillers, because the resulting final product has an otherwise lower density than a product without the filler, yet has essentially the same strength characteristics as if the filler was not present.

The core shell polymer is desirably a graft copolymer of the "core shell" type, or may also be a "shell-less" cross-linked rubbery particulate, such as acrylonitrile-butadiene-styrene (ABS), methacrylate-butadiene-styrene (MBS), and methacrylate-acrylonitrile-butadiene-styrene (MABS). BLENDEX 338 is an ABS powder from GE Plastics.

Part (B)
Epoxy Resins

The second component, part (b), includes a resin component employing reactive epoxy groups. The resin may include cycloaliphatic epoxides, epoxy novolac resins, bisphenol-A epoxy resins, bisphenol-F epoxy resins, bisphenol-A epichlorohydrin based epoxy resin, alkyl epoxides, limonene dioxides, and polyepoxides.

A desirable resin component is a cycloaliphatic epoxide sold by Dow Chemical under the brand name Cyracure UVR-6110. UVR-6110 has the following structure:

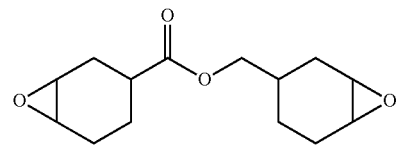 [SMILES: O=C(OCC1CCC2OC2C1)C1CCC2OC2C1]

Another suitable resin component is a bisphenol based liquid epoxy resin, such as those sold under the trade name "D.E.R." by Dow Chemical. For description of these epoxy resins, see http://epoxy.dow.com/epoxy/products/prod/liquid.htm. Examples of "D.E.R." products that are suitable for this invention include D.E.R. 332 (diglycidyl ether of bisphenol-A); D.E.R. 330 (low viscosity, undiluted, bisphenol-A liquid epoxy resin); D.E.R. 383 (low viscosity, undiluted, bisphenol-A liquid epoxy resin); D.E.R. 354 (standard, bisphenol-F based liquid epoxy resin); D.E.R. 351 (low viscosity, liquid bisphenol-A/F resin blend); D.E.R. 352 (low viscosity, liquid bisphenol-A/F resin blend); D.E.R. 324 (aliphatic glycidyl ether reactive diluent, modified liquid epoxy resin); D.E.R. 323 (aliphatic glycidyl ether reactive diluent, modified liquid epoxy resin); D.E.R. 325 (aliphatic glycidyl ether reactive diluent, modified liquid epoxy resin); and D.E.R. 353 (aliphatic glycidyl ether reactive diluent, modified liquid epoxy resin). A different brand of a bisphenol based liquid epoxy resin suitable for use in this invention is EPON™ Resin 828, derived from bisphenol A and epichlorohydrin, and commercially available from Hexion Specialty Chemicals. See http://www.hexionchem.com/pds/E/EPON™ Resin 828.pdf.

Another suitable resin component is an epoxy novolac resin, which are products of epichlorohydrin and phenolformaldehyde novolac, and sold under the trade name D.E.N. by Dow Chemical. For a description of these epoxy resins, see http://epoxy.dow.com/epoxy/products/prod/nov.htm. Examples of "D.E.N." products that are suitable for this invention include D.E.N. 431 (low viscosity semi-solid epoxy novolac resin); and D.E.N. 438 (semi-solid epoxy novolac resin).

Other suitable epoxy resins include polyepoxides curable with catalyst or hardeners at ambient temperatures or at suitable elevated temperature. Examples of these polyepoxides include polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane- 1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcinol, quinitol, bis(4-hydroxycyclohexyl)methane, 2,2-bis(4-hydroxycyclohexyl)propane, and 1,1-bis(hydroxymethyl)-cyclohex-3-ene; and from alcohols having aromatic nuclei, such as N,N-bis(2-hydroxyethyl)aniline and p,p'-bis(2-hydroxyethylamino) diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrabis(4-hydroxyphenyl) ethane, 2,2,-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenols substituted in the ring by chlorine atoms or by alkyl groups each containing up to nine carbon atoms, such as 4-chlorophenol, 2-methylphenol, and 4-t-butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycydyloxy-1,3-bis(5,5-dimethyl-1-glycidylhydantoin-3-yl)propane.

Epoxides derived from oils, such as epoxidized soybean oil, epoxidized castor oil, and the like are also suitable. Epoxides derived from or capable of being derived from the per-acid oxidation of unsaturation are also suitable, including epoxidized liquid rubber.

Benzoyl Peroxide

Benzoyl peroxide itself is a desirable choice for use in part (b). Commercially available benzoyl peroxide-containing compositions may also be used. Benox-50 210 Blue (from Syrgis Performance Initiators, Inc., Helena, Ark.), a peroxide paste believed to contain 49-50% benzoyl peroxide is one desirable choice. Benox-55 108 White, a peroxide paste believed to contain 54-56% benzoyl peroxide is another desirable choice. Still another desirable choice is Varox ASNS from R.T. Vanderbilt, Norwalk, Conn., a peroxide paste which is believed to contain 55% benzoyl peroxide.

Plasticizer

Plasticizers are used in part (b) of the two part composition. Plasticizers may also be used in part (a) as well. Plasticizers may be any liquid or soluble compound that assists with the flexibility of the reactive module of composition and/or may act as a carrier vehicle for other components of the composition. Examples include aromatic sulfonamides, aromatic phosphate esters, alkyl phosphate esters, dialkylether aromatic esters, polymeric plasticizers, dialkylether diesters, polyglycol diesters, tricarboxylic esters, polyester resins, aromatic diesters, aromatic triesters (trimellitates), aliphatic diesters, epoxidized esters, chlorinated hydrocarbons, aromatic oils, alkylether monoesters, naphthenic oils, alkyl monoesters, paraffinic oils, silicone oils, di-n-butyl phthalate, diisobutyl phthalate, di-n-hexyl phthalate, di-n-hepytl phthalate, di-2-ethylhexyl phthalate, 7c9c-phthalate (linear and branched), diisoctyl phthalate, linear 6c,8c,10c phthalate, diisononyl phthalate, linear 8c-10c phthalate, linear 7c-11c phthalate, diisodecyl phthalate, linear 9c-11c phthalate, diundecyl phthalate, diisodecyl glutarate, di-2-ethylhexyl adipate, di-2-ethylhexyl azelate, di-2-ethylhexyl sebacate, di-n-butyl sebacate, diisodecyl adipate, triethylene glycol caprate-caprylate, triethylene glycol 2-ethylhexanote, dibutoxyethyl adipate, dibutoxyethoxyethyl adipate, dibutoxyethoxyethyl formal, dibutoxyethoxyethyl sebacate, tri-2-ethylhexyl trimellitate, tri-(7c-9c (linear)) trimellitate, tri-(8c-10c(linear)) trimellitate, triethyl phosphate, triisopropyl phenyl phosphate, tributyl phosphate, 2-ethylhexyl diphenyl phosphate, trioctyl phosphate, isodecyl diphenyl phosphate triphenyl phosphate, triaryl phosphate synthetic, tributoxyethyl phosphate, tris(-chloroethyl) phosphate, butylphenyl diphenyl phosphate, chlorinated organic phosphate, cresyl diphenyl phosphate, tris (dichloropropyl) phosphate, isopropylphenyl diphenyl phosphate, trixylenyl phosphate, tricresyl phosphate, diphenyl octyl phosphate.

Block Copolymers

When used, the block copolymer may be any block copolymer capable of contributing to the physical properties desired for the disclosed composition.

The block copolymer rubber may be constructed using blocks of either butadiene or isoprene with styrene (for example, SBS, SIS, SEBS and SB), commercial examples of which are available from Shell Chemical Co. as KRATON D-1116 and other KRATON D-grade elastomers from Dexco as VECTOR 2411IP.

Other elastomers with Tg below about 25° C., which are soluble in methacrylate/acrylate monomers, can be used in place of the polychloroprene and/or the block copolymer rubbers. Examples of such are homopolymer of epichlorohydrin and its copolymers with ethylene oxide, available from Zeon Chemicals as HYDRIN, acrylate rubber pellets, available from Zeon as HYTEMP, polyisoprene rubber, polybutadiene rubber, nitrile rubber, and SBR rubber (random copolymer of butadiene and styrene).

Still other block copolymers may be a styrene maleic anhydride copolymer, represented by the formula:

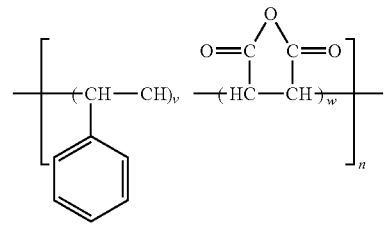

where v is from 1 to 12; w is from 1 to 6; and n is from 1 to 50.

Styrene maleic anhydride copolymers are well known and some of which are available commercially from Sartomer Company, Inc., Exton, Pa. under the trade name SMA EF80, for example. Styrene maleic anhydride copolymers represent the copolymerization product of styrene and maleic anhydride and are characterized by alternating blocks of styrene and maleic anhydride moieties.

Amphiphilic block copolymers may be particularly desirable. Arkema offers for sale commercially an amphiphilic block copolymer under the trademark NANOSTRENGTE. Such block copolymers are currently available in two versions: SBM and MAM. The SBM copolymer is reportedly made of polystyrene, 1,4-polybutadiene and syndiotactic poly(methyl methacrylate).

In addition, a polymer material constructed from polymethyl methacrylate ("PMMA") and polybutyl acrylate ("PB") may be used too. Polymer materials within this class are referred to as polymethylmethacrylate-block-polybutylacrylate-block polymethylmethacrylate copolymers ("MAM").

As reported by Arkema, MAM is a triblock copolymer, consisting of about 70% PMMA and 30% PB. MAM is constructed from distinct segments, which provides for the ability to self-assemble at the molecular scale. That is, M confers hardness to the polymer and A confers elastomeric properties to the polymer.

A hard polymer segment tends to be soluble in (meth) acrylates, whereas the elastomeric segments provide toughness to the polymeric (meth)acrylate, which forms upon cure. MAM also reinforces mechanical properties, without compromising inherent physical properties. MAM is commercially available under the tradename NANOSTRENGTH, at present under several different grades—i.e., E-21 and M-52N.

Arkema promotes the NANOSTRENGTH product line as an acrylic block copolymer that is miscible with many polymers, most of which according to the manufacturer are major industrial epoxy resins. See also U.S. Pat. No. 6,894,113, where in its abstract the '113 patent speaks to a thermoset material with improved impact resistance. The impact resistance is derived from 1 to 80% of an impact modifier comprising at least one copolymer comprising S-B-M, B-M and M-B-M blocks, where each block is connected to the other by a covalent bond or of an intermediary connected to one of the blocks by a covalent bond and to the other block by another covalent bond, M is a PMMA homopolymer or a copolymer comprising at least 50% by weight of methyl methacrylate, B is incompatible with the thermoset resin and with the M block and its glass transition temperature Tg is less than the operating temperature of the thermoset material, and S is incompatible with the thermoset resin, the B block and the M block and its Tg or its melting temperature is greater than the Tg of B.

Another commercially available example of an amphiphilic block copolymer is a polyether block copolymer known to the trade as FORTEGRA 100, from Dow Chemical Co. Dow describes FORTEGRA 100 as a low viscosity toughening agent designed for use as a high efficiency second phase, in amine cured epoxy systems. FORTEGRA 100 is reported to provide improved toughness without significantly affecting the viscosity, glass transition temperature, corrosion resistance, cure rate or chemical resistance of the final coating or composition. FORTEGRA 100 is also reported to be useful for formulation into standard bisphenol A and bisphenol F epoxy systems as it does not participate in the epoxy cure reaction. As a second phase toughening agent, FORTEGRA 100 is promoted as being effective when formulated at a specific volume fraction of the finish film or part, typically 3% to 8% by dry volume is said to achieve the toughening effect.

Additional block copolymers include those which comprise both hydrophobic and hydrophilic segments or portions, of the general formula:

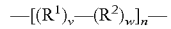

where here $R^1$ is independently a hydrophobic olefin, such as ethylene, propylene, 1-butene, 1-hexene, 3-methyl-1-pentene, or 4-methyl-1-pentene or a polymerizable hydrophobic aromatic hydrocarbon such as styrene; each $R^2$ is a hydrophilic acid anhydride, such as maleic anhydride; v is from 1 to 12; w is from 1 to 6; and n is from 1 to 50.

The ratio of the hydrophobic segments to the hydrophilic segments in the styrene maleic anhydride block copolymer may be at least 2:1, such as between 3:1 and 12:1. The hydrophilic segments in the block coplymer should comprise an anhydride, such as maleic anhydride. The hydrophobic segments in the block coplymer should comprise at least one of ethylene, propylene, 1-butene, 1-hexene, 3-methyl-1-pentene, 4-methyl-1-pentene, or styrene. Desirably, the block copolymer should be prepared with the hydrophilic segments comprising maleic anhydride and the hydrophobic segments comprising styrene.

Reference to the following U.S. patent documents shows amphiphilic block copolymers suitable for use herein, and as such are incorporated herein by reference. U.S. Pat. No. 7,745,535 is directed to and claims an amphiphilic multiblock copolymer where at least one block is a profiled block consisting of a) a hydrophilic middle block made from one or more monomeric units selected from acrylic acid, methacrylic acid, and the salts, esters, anhydrides and amides of acrylic acid and methacrylic acid; dicarboxylic acid anhydrides; carboxyethyl acrylate; and acrylamides; and b) hydrophobic end blocks where the multiblock copolymer is water insoluble, water indisperible, and not soluble or dispersible in $C_{1-3}$ alcohols.

U.S. Pat. No. 7,820,760 is directed to and claims a curable adhesive epoxy resin composition including (a) an epoxy resin; (b) an amphiphilic block copolymer containing at least one epoxy resin miscible block segments and at least one epoxy resin immiscible block segments (where the immiscible block segment comprises at least one polyether structure provided that the polyether structure of the immiscible block segment contains at least one or more alkylene oxide monomer units having at least four carbon atoms); and (c) at least one curing agent. The amphiphilic block copolymer in the '760 patent is an all polyether block copolymer such as a PEO-PBO diblock copolymer or a PEO-PBO-PEO triblock copolymer. The amphiphilic block copolymer is present in an amount such that when in the '760 patent the epoxy resin composition is cured, the bond strength of the resulting cured epoxy adhesive resin composition increases compared to an epoxy resin composition without the amphiphilic polyether block copolymer.

U.S. Pat. No. 7,670,649 is directed to and claims a curable ambient cure high-solids coating composition including (a) an epoxy resin; (b) an amphiphilic block copolymer containing at least one epoxy resin miscible block segment (where the immiscible block segment comprises at least one polyether structure provided that the polyether structure of the immiscible block segment contains at least one or more alkylene oxide monomer units) and at least one epoxy resin immiscible block segment; and (c) a sufficient amount of a nitrogen-containing curing agent to cure the coating composition at ambient temperature of less than about 60° C. When the epoxy resin composition is cured, the toughness of the resulting cured epoxy resin composition is increased.

U.S. Pat. No. 6,887,574 is directed to and claims a curable flame retardant epoxy resin composition including (a) at least one flame retardant epoxy resin; (b) at least one amphiphilic block copolymer; and (c) a curing agent. Such components are present in the curable composition in the appropriate amounts and ratios such that, upon curing, the block copolymer self-assembles into a nano structure morphology, such as a worm-like micelle morphology. The resulting cured product is reported to have a remarkably increased high fracture resistance; and allows the use of flame retardant epoxies in applications where fracture resistance is an issue.

U.S. Patent Application Publication No. 2008/0287595 is directed to a composition comprising (1) a thermosettable resin selected from an epoxy resin, an epoxy vinyl ester resin, an unsaturated polyester resin or a mixture thereof, and (2) an amphiphilic mock copolymer dispersed in the thermosettable resin. In addition, fiber-reinforced plastics (FRP), coatings and composites prepared from the composition are provided as well.

International Patent Publication No. WO 2010/008931 is directed to a structural composite that uses a block copolymer toughening agent to increase the fracture resistance (toughness) of the structural composite. The structural composite comprises (i) a carbon fiber reinforcing material and (ii) a thermosettable resin composition; wherein the thermosettable resin composition comprises (a) a thermosettable resin and (b) at least one block copolymer toughening agent.

International Patent Publication No. WO 2009/018193 is directed to curable compositions, cured compositions, and methods of forming the same, including an epoxy resin, a curing agent, an amphiphilic toughening agent, and an inorganic nanofiller, where the toughening agent forms a second phase having at least one dimension being on the nanometer scale.

The block copolymer may be used herein in an amount up to about 50 weight percent, desirably from 5 to 40 weight percent based on the total weight of the adhesive composition.

The glass transition temperature ("Tg") of the block copolymer should be above about 40° C. In one embodiment, the Tg of the block copolymer is between about 40° C. and about 155° C.

The Tg of a polymer is the temperature at which the polymer becomes brittle on cooling or soft on heating. More specifically, Tg defines a pseudo second order phase transition in which a polymer yields, on cooling, a glassy structure with properties similar to those of a crystalline material. Above Tg, the polymer becomes soft and capable of plastic deformation without fracture. While the Tg is occasionally described as the "softening temperature" of a polymer, it is not uncommon for the polymer to begin softening at a temperature below the Tg. This is because, due to the nature of many non-crystalline polymers, the softening of the polymer may occur over a temperature range rather than abruptly at a single temperature value. Tg generally refers to the middle point of this range even though the polymer may begin to soften at a different temperature. For purposes of this application, the Tg of a polymer refers to the value as determined by ASTM E-1356.

In addition to becoming brittle at temperatures below Tg, a polymer also generally becomes drier and less tacky than when that same polymer is heated to a temperature above its Tg. A tacky polymer will more readily adhere to a surface upon application of pressure alone than a non-tacky polymer. The importance of incorporating a copolymer that has a Tg above 40° C., and thus is dry or only slightly tacky at this point, will become more apparent by the discussion that follows.

Other Additives

Part (b) may contain additional additives, such as fillers, lubricants, thickeners, and coloring agents. The fillers provide bulk without sacrificing strength of the adhesive and can be selected from high or low density fillers.

Of particular interest are low density fillers, because the resulting final product has an otherwise lower density than a product without the filler, yet has essentially the same strength characteristics as if the filler was not present.

Packaging and Mixing

Each of parts (a) and (b) are packaged in separate containers, such as bottles, cans, tubes, or drums.

Parts (a) and (b) are mixed in a ratio of about 3 to 50 parts (a) to one part (b). Preferably, the ratio of parts (a) to (b) is about 5 to 20 parts (a) to one part (b).

The mixing of the two parts can employ a mixing nozzle, which has fluid inputs for the two components, performs a suitable mixing operation, and dispenses the adhesive mixture directly onto the surface to be bonded. An example of a commercially available mixing and dispensing device is MIXPAC®, available from ConProTec, Salem, N.H. The two parts can also be mixed manually in a bowl, bucket, or the like, but the operator needs to ensure that the mixing is thorough. As an aid to ensuring that mixing is complete, each part can be formulated with a dye or pigment, so that after mixing, a third color is formed. For example, one part may have a yellow dye, the other part may have a blue dye, so that after mixing, the complete adhesive composition will be green.

The inventive compositions are excellent adhesives and sealants. On application to a first surface, such as a sheet of fabric that can be incorporated into a laminated material, a second surface will be mated with the first surface and the two surfaces will be bonded together as the adhesive cures. A further advantage is that no surface preparation is required to bond clean substrates.

By the term "curing" is meant that the chemical reaction converting the fluid mix to the solid bond of this invention. The curing process of acrylic-epoxy adhesives is well known in the art. See e.g. U.S. Pat. No. 4,426,243 (Briggs). The curing process is a chemical reaction between the acrylate and epoxy based polymers, to form an adhesive acrylic-epoxy adhesive.

The curing process of this composition is exothermic, and may reach a temperature of about 120° C. or so, when a large bead of adhesive is used.

After mixing, the adhesive compositions cure in about 15 to 1000 minutes at room temperature and for about 30 seconds to 120 seconds at a temperature of about 60°. Desirably, the adhesive compositions cure in about 100 to 150 minutes at about 25° C.

EXAMPLES

Example 1

Part (a) Composition

A 50 L vessel was charged with 27.1 kg methylmethacrylate, 11.8 kg methacrylic acid, 0.1 kg of EDTA, and 0.01 kg of the methyl ether of hydroquinone, SARTOMER SR-708 0.91 kg, and HYDRO RLP VTB 2000X168 10.41 kg. The mixture was blended with an auger at 1000 rpm for 10 minutes, at which time 5.4 kg of BLENDEX 338 was added and mixing continued AND 4.148 of paraffin wax was added and stirring continued for 2 hours. VECTOR 24118 8.22 kg was thereafter added and stirred for an additional hour. Isobornyl (meth)acrylate 24.49 kg was added and stirred for an additional 10 minutes. Thereafter, 0.561 kg DMPT, 0.461 kg TMD, and 0.90 kg T-MULZ 1228 were added and mixing continued. Finally, BiCat Z 0.92 kg and yellow pigment 0.09 kg were added and stirred for 20 minutes. The final part (a) was packed into 490 mL nylon cartridges.

Part (b) Composition

A 10 L vessel was charged with 22.53 kg EPON 828, benzoyl peroxide (Benox B-50 and Benox B-55), paste dispersions from Norac, Inc., Asuza, CA), 47 kg, 22.52 kg BENFLEX 2088 and 7.0 kg NANOSTRENGTH E21. The mixture was blended with an auger for 30 minutes at 1000 rpm. The final product was packed into nylon cartridges for use in meter mix equipment.

Mixing

Parts (a) and (b) were mixed with a MIXPAC nozzle set to a 10:1 mixture of parts (a) and (b). After mixing, the time to cure is approximately 110 to 130 minutes. Coupons were bonded 1" by 0.5", 30 mil bondline, and no surface preparation, and had an anodized aluminum substrate shear strength of 1600 to 1800 psi.

The composition was also applied to an anodized aluminum lap shear coupon and mated to another anodized aluminum lap shear coupon with 0.5" overlap. The coupons were placed into a press with a heated upper platen, and compressed to the lower cold platen at about 150 psi. The coupon silt achieved a fixture strength of >3kg in less than 45 seconds.

What is claimed is:

1. An adhesive composition comprising:
   (a) a first part comprising:
      (i) a (meth)acrylic component at least a portion of which comprises isobornyl(meth)acrylate in an amount of about 5 to about 35 percent by weight of the total composition;
      (ii) an amine catalyst;
      (iii) a vinyl terminated polybutadiene in liquid form at room temperature;
      (iv) a reactive acid component;
      (v) a solid zinc (meth)acrylate salt;
      (vi) a zinc and/or bismuth complex; and
      (vii) a free-radical inhibitor; and
   (b) a second part comprising:
      (i) a resin component comprising epoxy groups;
      (ii) a benzoyl peroxide; and
      (iii) a plasticizer,
wherein when the first and second parts are mixed and applied to at least one substrate, the composition will have up to 5 minutes of open time and when the substrates are mated the composition show a fixture time of less than 90 seconds at a temperature of less than 120° C. at which point the mated assembly can support 3 kg load.

2. The composition of claim 1, wherein the (meth)acrylic component of part (a) is selected from the group consisting of methyl (meth)acrylate, (meth)acrylic acid, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(meth)acryloyloxypropyl trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate, and combinations thereof.

3. The composition of claim 1, wherein the amine is selected from the group consisting of 1,8-diazabicyclo(5.4.0)undec-7-ene, 1,4-diazabicyclo(2.2.2)octane, triethylamine, tetramethylguanidine, dimethyl-p-toluidine, dimethyl aniline, dihydroxyethyl aniline, dihydroxy ethyl p-toluidine, dimethyl-o-toluidine, dimethyl aniline, and benzoyl-thiourea, a trialkyl amine, tributyl amine, dihydro pyridine, phenyl dihydro pyridine, dihydropyridine derivatives, aldehyde condensation products of alkyl, aromatic, heterocyclic amines, and combinations thereof.

4. The composition of claim 1, wherein the reactive acid component is sulphonic acid or sulphonic acid derivatives.

5. The composition of claim 1, wherein the reactive acid component is selected from the group consisting of phosphoric acid, phosphoric acid derivatives, and phosphate esters.

6. The composition of claim 1, wherein the reactive acid component is a phosphate ester comprising a compound of the formula:

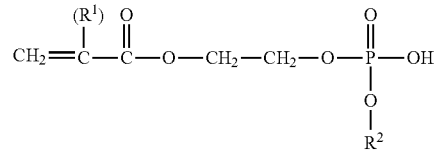

wherein $R^1$ is H or $CH_3$, and $R^2$ is H or:

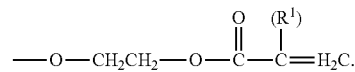

7. The composition of claim 1, wherein the reactive acid component is hydroxyl ethyl methacrylate phosphate ester.

8. The composition of claim 1, wherein the free radical inhibitor is selected from the group consisting of quinones, hydroquinones, hydroxylamines, nitroxyls, phenols, amines, amines, quinolines, phenothiazines, and combinations thereof.

9. The composition of claim 1, wherein the free radical inhibitor is selected from the group consisting of hydroquinone, tertiary butylhydroquinone, phenothiazine, methyl hydroquinone, hydroxyethylhydroquinone, N-alkyl substituted p-phenylenediamines, and combinations thereof.

10. The composition of claim 1, wherein the epoxy resin of part (b) is selected from the group consisting of cycloaliphatic epoxides, epoxy novolac resins, bisphenol-A epoxy resins, bisphenol-F epoxy resins, bisphenol-A epichlorohydrin based epoxy resin, alkyl epoxides, limonene dioxide, polyfunctional epoxides, and combinations thereof.

11. The composition of claim 1, wherein the epoxy resin of part (b) is a liquid bisphenol A epichlorohydrin epoxy resin.

12. A method of preparing a two-part adhesive composition of claim 1, comprising the steps of:
 (a) providing a first part of the adhesive composition comprising:
  (i) a (meth)acrylic component at least a portion of which comprises isobornyl(meth)acrylate;
  (ii) an amine catalyst;
  (iii) a vinyl terminated polybutadiene in liquid form at room temperature;
  (iv) a reactive acid component;
  (v) a solid zinc (meth)acrylate salt;
  (vi) a zinc and/or bismuth complex; and
  (vii) a free-radical inhibitor; and
 (b) providing a second part of the adhesive composition comprising:
  (i) a resin component comprising epoxy groups;
  (ii) a benzoyl peroxide;
  (iii) a plasticizer; and
  (vi) optionally, a block copolymer.

13. A method of bonding a first surface to a second surface, comprising:
 providing a two part adhesive composition of claim 1, providing a first surface to be bonded and a second surface to be bonded, dispensing with mixing the two part adhesive composition onto at least one of the first surface or the second surface, mating the first surface and the second surface with the adhesive composition between the mated first surface of the second surface, and forming an adhesive bond therebetween.

14. The method of claim 12, wherein the first part and second are mixed in a ratio of 0.5 to 15 parts part (a) to one part (b) by volume.

15. The composition of claim 1, wherein the (meth)acrylic component of part (a) further comprises methyl (meth)acrylate.

16. The composition of claim 1, wherein part (a) further comprises a block copolymer.

* * * * *

UNITED STATES PATENT AND TRADEMARK OFFICE
CERTIFICATE OF CORRECTION

PATENT NO.         : 9,574,118 B2
APPLICATION NO.    : 14/266971
DATED              : February 21, 2017
INVENTOR(S)        : Chih-min Cheng, James Murray and Charles F. Schuft Page 1 of 1

It is certified that error appears in the above-identified patent and that said Letters Patent is hereby corrected as shown below:

In the Specification

Column 8, Line 66: Change "NANOSTRENGTE" to -- NANOSTRENGTH --.

In the Claims

Column 14, Line 8 in Claim 2: Change "trimethylopropane" to -- trimethylolpropane --.

Column 14, Line 59 in Claim 8: Before "quinolones", delete "amine".

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*